(12) United States Patent
Hoefler et al.

(10) Patent No.: US 7,343,208 B2
(45) Date of Patent: Mar. 11, 2008

(54) METHOD FOR SELECTING AND/OR PRODUCING AUTOMATION HARDWARE

(75) Inventors: Werner Hoefler, Eckental (DE); Norbert Becker, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 113 days.

(21) Appl. No.: 11/025,946

(22) Filed: Jan. 3, 2005

(65) Prior Publication Data

US 2005/0198607 A1 Sep. 8, 2005

Related U.S. Application Data

(63) Continuation of application No. PCT/DE03/02225, filed on Jul. 3, 2003.

(30) Foreign Application Priority Data

Jul. 3, 2002 (DE) .................... 102 29 869

(51) Int. Cl.
*G06F 9/45* (2006.01)
*G06F 17/50* (2006.01)
*G06F 11/30* (2006.01)
*G06F 19/00* (2006.01)

(52) U.S. Cl. .............. 700/83; 702/182; 702/183; 716/4; 716/5; 703/14; 703/15; 703/16

(58) Field of Classification Search .......... 700/83, 700/49, 99; 716/18, 5; 717/104, 100; 702/183
See application file for complete search history.

(56) References Cited

U.S. PATENT DOCUMENTS

| | | | | |
|---|---|---|---|---|
| 4,885,694 A | | 12/1989 | Pray et al. | |
| 5,987,242 A | * | 11/1999 | Bentley et al. | 703/13 |
| 6,556,950 B1 | * | 4/2003 | Schwenke et al. | 702/183 |
| 6,782,385 B2 | * | 8/2004 | Natsumeda et al. | 707/6 |
| 6,847,854 B2 | * | 1/2005 | Discenzo | 700/99 |
| 6,862,553 B2 | * | 3/2005 | Schwenke et al. | 702/183 |
| 6,868,538 B1 | * | 3/2005 | Nixon et al. | 717/100 |
| 6,934,931 B2 | * | 8/2005 | Plumer et al. | 717/104 |
| 6,970,771 B1 | * | 11/2005 | Preiss et al. | 700/286 |
| 7,050,873 B1 | * | 5/2006 | Discenzo | 700/99 |
| 7,266,476 B2 | * | 9/2007 | Coburn et al. | 702/183 |
| 2005/0278670 A1 | * | 12/2005 | Brooks et al. | 716/5 |

FOREIGN PATENT DOCUMENTS

WO   WO 96/16361 A1   5/1996

OTHER PUBLICATIONS

Thomas Gerstner et al, Rationelles Projektieren Von Automatisierungs-Systemen, ATP-Automatisierungstechnische Praxis, vol. 36, No. 12, Dec. 1, 1994, pp. 42-45, Oldenbourg Verlag, Munich, Germany.

* cited by examiner

*Primary Examiner*—Anthony Knight
*Assistant Examiner*—Sunray Chang
(74) *Attorney, Agent, or Firm*—Sughrue Mion, PLLC

(57) ABSTRACT

A method for selecting and/or producing automation hardware which is appropriate or necessary for controlling and/or monitoring a technical process to be automated (10) according to an automation solution is provided. The method includes developing the description of the automation solution, analyzing this description with an analysis tool (20) and selecting and, where applicable, producing respective automation hardware on the basis of the analysis of the description.

17 Claims, 2 Drawing Sheets

10. Technical Process
11. User Dialog
12. Representation
13. Input Mask
14. Selection Area
15. Database
16. Data Record
M. Motor 20. Analysis Tool
21. Input Data
22. Planning Data
23. Selection Means
24. First Matrix
25. Component List 26. List of Inputs and Outputs
27. Calculation Means
28. Second Matrix
29. Knowledge Base
30. Capacity Determining Means
31. Query Dialog
32. User Inputs

METHOD FOR SELECTING AND/OR PRODUCING AUTOMATION HARDWARE

This is a Continuation of International Application PCT/DE03/02225, with an international filing date of Jul. 3, 2003, which was published under PCT Article 21(2) in German, and the disclosure of which is incorporated into this application by reference.

FIELD AND BACKGROUND OF THE INVENTION

1. Field of the Invention

The present invention relates to a method for selecting and/or producing automation hardware. In particular, the present invention relates to a method, which automatically supports the selection of appropriate automation hardware, i.e., automation hardware that is suitable for a technical process to be controlled and/or monitored.

2. Description of Related Art

The generic term automation hardware, as used hereinafter, denotes any type of hardware suitable for controlling and/or monitoring a technical process. For example, automation hardware may include intelligent control devices such as process computers, stored program controllers or decentralized peripheral devices, etc., and input and/or output modules for such computers, controllers or peripheral devices, which are configured to connect to digital or analog inputs or outputs of the technical process.

The term automation hardware may further include connection means such as bus interfaces, bus connections, etc. for communicatively connecting the above described devices to each other. The term automation hardware may further include functional units, e.g., controllers and motor controls, such as frequency converters, speed monitors, limit monitors, etc.

Finally, the term automation hardware may also include the direct process peripherals, i.e., devices such as switches, probes, limit switches (mechanical, inductive or capacitive), photoelectric barriers, etc., which are provided and adapted to detect states of the controlled and/or monitored technical process, and devices such as valves, motors, lighting means, etc., which are provided and adapted for influencing the technical process.

The devices listed above are provided by way of example only. As a whole, these exemplary devices listed above as well as other functionally equivalent devices or other devices known in the automation environment of technical processes are hereinafter referred to as "automation hardware". Moreover, individual devices from this spectrum, e.g., a stored program controller or a decentralized peripheral device, a sensor or an actuator, such as a switch or a motor, are hereinafter referred to as an "automation component" or an "automation device".

Today, automation hardware is manually selected by experienced and knowledgeable specialists who are entrusted with such tasks. These specialists are usually familiar with the product spectrum of the individual automation hardware suppliers. For example, the specialists acquire their knowledge of the product spectrum of the individual hardware suppliers from past automation projects and the resulting automation solutions. That is, the specialists acquire their knowledge based on the use of specific automation hardware to control and/or monitor a specific technical process using specific control software. Using this knowledge about the individual automation components, the respective specialist selects the components that, in his or her view, are best suited for the task.

A disadvantage of this known procedure, however, is that the knowledge of the respective specialist about the available automation hardware as a whole is limited. The decision in favor or against a specific automation component is possibly influenced more by whether the specialist knows the component than by factual-technical considerations such as optimal suitability for the corresponding automation task or automation sub-task. Furthermore, even extensive technical knowledge of the respective specialist can not fully consider all possible mutual dependencies of individual automation components. Even if special detailed knowledge about the supply spectrum of many different automation hardware suppliers enable a specialist to select optimal components of a first supplier for a first automation sub-task and optimal components of a second supplier for a second automation sub-task, a significant problem may arise when automation components of two different suppliers are used together. The components may not be compatible, and providing suitable interfaces for these components may be disproportionately costly.

OBJECTS OF THE INVENTION

One object of the present invention is to provide a method, which can avoid the above-discussed drawbacks.

Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

SUMMARY OF THE INVENTION

According to an illustrative, non-limiting formulation of the present invention, a method for selecting and/or producing automation hardware appropriate or necessary for controlling and/or monitoring a technical process to be automated according to an automation solution is provided, The method includes: developing an electronically readable description of an automation solution, then analyzing the developed description using a computer-aided analysis tool. The method further includes supplementing the description by having the analysis tool initiate a dialog with a user for individual elements of the description which represent the specification of individual automation hardware components. Finally, the method includes selecting and/or producing the respective automation hardware based on the analysis of the description.

According to an illustrative, non-limiting formulation of the present invention, a description of the automation solution is usually based on a description of the technical process that is to be automated. One form of the description of the automation solution includes, for example, a design drawing for the technical process. This description may be supplemented by information on actuators and sensors that are used to influence the process and to determine process states. For different abstraction levels of the description, e.g., relating on the one hand to the process as a whole and on the other hand to individual partial processes, separate descriptions of the automation solution can be developed and analyzed.

In the exemplary, non-limiting formulation, since any description of the automation solution, making reference to the automation task where applicable, at least implicitly includes the essential information necessary for the specifications of the respectively required automation hardware, the automation hardware can be individually selected and, where necessary, produced. The process is analogous, for example, to the purchase of a new car where the prospective buyer's requirements regarding the car to be purchased, combined with the individual financial flexibility, at least implicitly include a specification of the car to be purchased. The prospective buyer knows the purpose for which the newly purchased car is to be used. For example, if the car is intended for a family with two children, the specifications for the vehicle to be purchased result from the need for seating capacity and space. Based on these specifications, a decision can then be made whether to purchase a convertible, a coupe, a sedan or a station wagon, etc.

In this formulation of the present invention, the user, aided by a computer, selects the automation hardware necessary and appropriate for solving the automation problem and ultimately for automatically controlling and/or monitoring the technical process.

The description of the automation solution, in the form of a design drawing, preferably includes at least parts of the technical process and the associated components of the automation hardware to be selected and/or produced, e.g., in the form of "placeholders" for actuators, i.e., motors, valves, etc., and sensors, i.e., digital or analog transducers, etc. In the user dialog, the user can select appropriate components to fill in the placeholders, e.g., a motor to drive a moving component in the technical process or a valve for the controlled opening or closing of reactors in a processing plant. In this embodiment of the present invention, the description of the automation process may be in a form of a design drawing.

The user dialog preferably includes the input of parameters specifying the individual components of the automation hardware. The automation hardware components represented by the individual placeholders, for example, can then be specified successively by entering parameters in a user dialog called up for each placeholder. In the case of a motor, for example, power consumption of the motor can be specified. In the case of an analog transducer, its measuring range and resolution and thus the required data format, e.g., 8, 16, or 32 bit, can be determined.

If the one or each user dialog includes a number of appropriate automation hardware components for selection by the user, a first pre-selection of appropriate components is already made automatically, from which the user then selects a concrete component. Such an automatic pre-selection is made, for example, by using the description of the automation solution, i.e., for example, by using the design drawing or the previously entered, concrete parameters. If, for example, a DC motor is selected by specifying parameters, the user dialog no longer includes any AC motors once this selection has been made, such that the overview of the remaining components is simplified with each concretization.

According to an advantageous refinement of the present invention, the suitable components provided for selection in the one or each user dialog may also be determined based on associated parts, i.e., plant parts, such as mechanical or electrical components, of the technical process. If, for example, in sections of the technical process that physically belong together, a plurality of states of the technical process must be monitored by recording their respective input values, it may be necessary, because of the large number of these input values and because the locations where these input values are obtained belong together physically, to provide a decentralized peripheral device with a respective input functionality.

As an alternative or in addition, the suitable components provided for selection in the one or each user dialog may be determined based on automation hardware components that have already been selected. For example, if a stored program controller has already been selected for a part of the technical process, it is possible, when additional process peripherals are specified, e.g., in the form of input or output modules, to offer primarily process peripherals that are intended or appropriate for use with the previously selected stored program controller.

Preferably, the automation hardware components that belong together are selected to correspond to parts of the technical process that belong together. This makes it possible, for example, to assign a plurality of outputs for influencing the technical process to a single output module with a respective number of outputs. The fact that such outputs, for example, belong together physically and/or functionally can be determined by using the so-called plant identifiers, which are usually assigned to the individual elements of technical design drawings.

Moreover, the components provided for selection in the one or each user dialog may be determined by using a database. This database may contain the data for the automation components that can be selected. The database may further include a specific data record for each component. Components of the same kind, such as different models of motors, are distinguished by structurally similar data records. In other words, each "motor data record" includes, for example, at least one datum that encodes the power consumption of the respective motor. Thus, when the user selects a motor and specifies a certain power consumption for that motor, all the data records for motors and, among them, the data records that encode a motor with a suitable power consumption, can be selected by accessing the database.

Each data record may further include information on the compatibility of the respective encoded automation hardware component with other components. Such data can be used, for example, to limit the possible selections to components that are compatible with previously selected components. As an alternative or in addition, e.g., at the end of the selection process of the individual automation hardware components, these data can be used to check which components might possibly be mutually incompatible for solving the automation task. A compatibility check that is performed during the input process can have the drawback that the selection becomes increasingly limited and no alternatives can finally be offered. In contrast, if the compatibility check is performed only at the end, it is clear in the overall context which components are mutually incompatible, such that the "problem components" can be directly replaced by suitable components again supported by the user dialog.

The contents of the database may also be determined by previous uses of the method. Accordingly, the database continues to "grow" because each time the method is used, new components are used, and consequently, these new components are added to the database. On the other hand, the user can add information on the mutual compatibility of individual components to the database, so that the database grows along with the experience of the respective user.

One embodiment of the invention assumes that either the automation task or the solution of the automation task includes the essential information required to specify the automation hardware at least implicitly in the form of the respective control program. Based on these specifications, the automation hardware can again be individually selected and, if necessary, produced. Accordingly, the description of the automation solution is a control program for controlling the automation hardware to be selected and/or produced.

If the control program for controlling and/or monitoring the technical process considers a plurality of inputs assigned by the technical process and influences a plurality of outputs assigned by the technical process such that an input list that includes this number of inputs and an output list that includes this number of outputs are provided as elements of the description, and such that the scope of the input list is used to select and/or produce automation hardware in the form of input modules and the scope of the output list is used to select and/or produce automation hardware in the form of output modules then the process peripherals, in the form of input and output modules in the scope appropriate for the technical process, are selected and, where applicable, produced.

Preferably, once the selection of the automation hardware has been completed, a data record representing the selected automation hardware is preferably transmitted to an automation hardware supplier to obtain an offer for the selected automation hardware. Alternatively, a purchase order for the selected automation hardware is directly released to a supplier(s), for example.

Thereby, the user need not look up the individual components in a catalog and then place a respective inquiry or order with the respective manufacturer. With the selection, information is available regarding the supplier and the associated ordering data, e.g., a model number or order number, because this type of information may be part of the data stored in the database. The data record representing the selected automation hardware can thus be directly transmitted to an automation hardware supplier. Based on the transmitted data record, the supplier will know which automation components were selected and how many units and, where applicable, what performance categories are required.

The automation hardware or components thereof can be custom produced based on the selection made. In other words, if a function catalog is developed in connection with the user dialog during the specification of an automation hardware component, e.g., a stored program controller, and the function catalog includes, for example, the number of inputs and outputs, the type of the communicative connection, e.g., a Profibus connection, the configuration and/or the degree of protection, e.g., IP65, and special functions, e.g., control functions (e.g., PID controller), interrupt processing, clock timer, etc., an automation component meeting these specifications can be custom produced or assembled.

The data from the data record created when the respective automation hardware component is specified include information required for such custom production. Similar to automobile production, for example, where a wide variety of customer requirements can likewise be considered in making a selection and every single automobile is custom tailored to the corresponding customer, the data can be accepted by the devices used to produce the automation hardware. In contrast to the automobile production, the automation hardware production may have many different functions that are software implemented so that custom production consists at least in part of transferring selected software functions into otherwise unchanged automation hardware. With respect to the hardware, custom production may be facilitated by the fact that individual functions can be implemented by physically separate or separable function modules so that specific function modules can be inserted into the automation hardware as needed.

BRIEF DESCRIPTION OF THE DRAWINGS

The present invention will now be described in detail by describing an illustrative, non-limiting embodiment thereof with reference to the accompanying drawings. In the drawings, the same reference characters denote analogous elements.

DETAILED DESCRIPTION OF ILLUSTRATIVE, NON-LIMITING EMBODIMENTS

Figure 1:
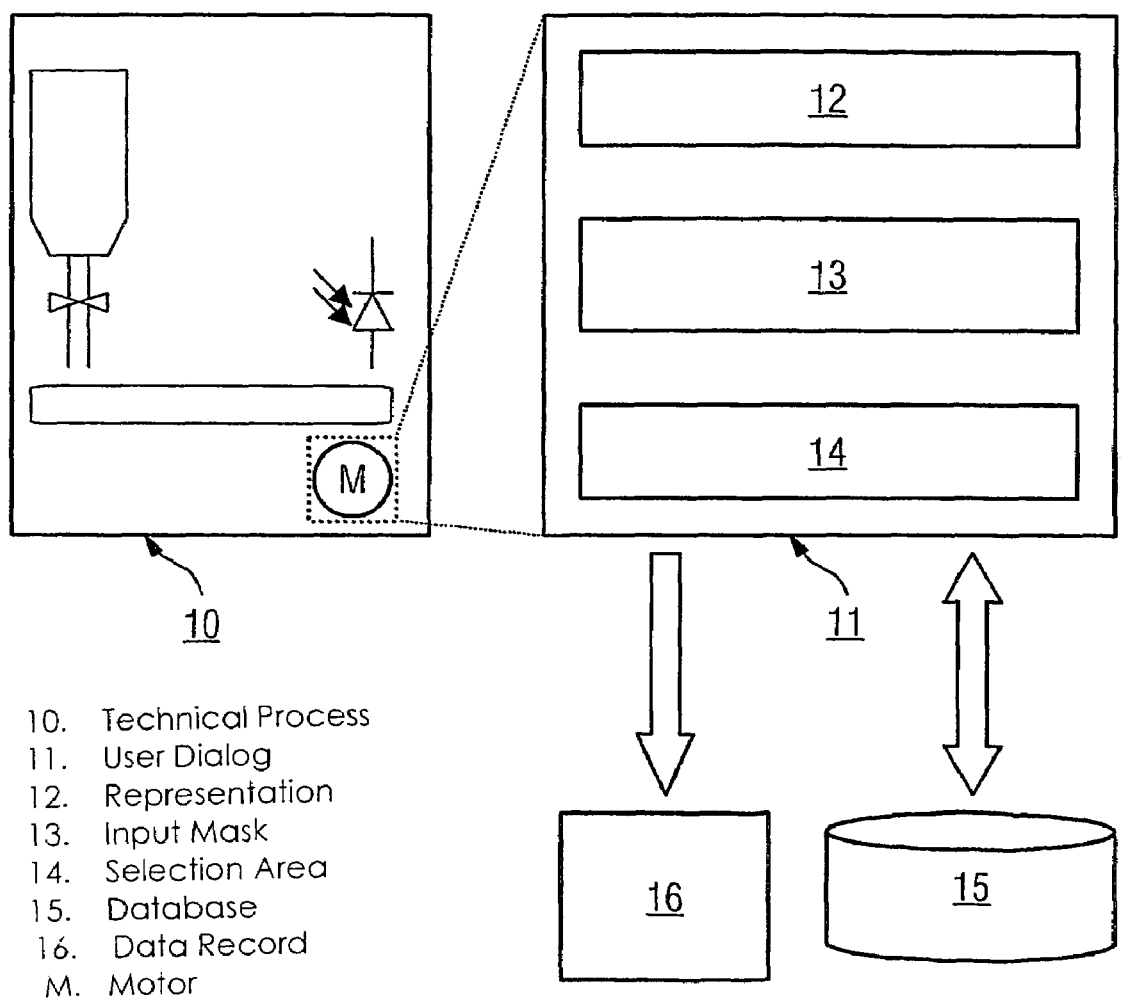
FIG. 1 shows an overview of a method for selecting and/or producing automation hardware appropriate or necessary for controlling and/or monitoring a technical process, according to an exemplary, non-limiting embodiment of the present invention.

FIG. 1 is a stylized representation, in the form of a design drawing, of an exemplary technical process 10. Solely by way of illustration, the technical process depicted in FIG. 1 includes a reactor from which material is withdrawn depending on the position of a valve. The material reaches a conveyor belt driven by a motor depicted by a character reference M. A photoelectric barrier at the end of the conveyor belt is used to detect the presence of material.

Process such as the exemplary process 10 depicted in FIG. 1 generally run automatically these days. The automated operation of the technical process requires automation hardware. To select the required automation hardware, a description of the technical process 10 is analyzed. For example, a description of the technical process 10 in the form of the design drawing may be analyzed. This analysis is computer-aided by using an analysis tool 20 (depicted in FIG. 2 and not in FIG. 1). Since today the design drawings are typically prepared with the aid of a computer, the respective design drawing data may be accessed directly by the automation tool 20.

Usually, the data of the design drawing can be broken into individual elements. The automated technical process represented by the design drawing can be split into individual elements that represent individual automation components. For example, in the exemplary technical process 10 depicted in FIG. 1, the data of the design drawing can be split into an element representing the reactor, an element representing the valve, an element representing the conveyor belt, etc. The analysis tool initiates a dialog with a user via a user dialog 11 for some or all of the elements. In particular, the analysis tool selects an element from the description of the technical process and requests from the user further specification of the selected individual automated hardware component.

In the example illustrated in FIG. 1, the motor M of the technical process 10 is the element selected for further specification. The analysis tool further successively selects all the elements from the description of the technical process 10 for further specification. In addition, the user can also specifically select individual elements for further specification and can thereby influence the sequence of the specification of the individual elements defined by the analysis tool.

The user dialog 11 includes a representation 12 of existing data for each respective element. In the example depicted in FIG. 1, the representation 12 includes information that the element is a motor M and that the motor is provided to drive the conveyor belt.

The user dialog 11 further includes an input mask 13, i.e., a template or a screen, for entering parameters further particularizing the individual automated hardware components. To further particularize an automated hardware component, various parameters come into consideration, for which the analysis tool provides fields for the user to input and/or select values. For each category of automation hardware, e.g., a motor, a sensor or a stored program controller, there is a corresponding set of parameters. The automation tool provides a respective input mask 13, having fields representing this set of parameters based on the element of the technical process 10 that is to be particularized at this time. That is, the automation tool requests the operator to enter values for the various parameters, represented by fields of the input mask 13.

For example, for the motor M, the input mask 13 may include parameters relating to the power consumption of the motor and parameters relating to the selection of a DC, AC, or a three-phase motor. In addition, parameters for weight or physical dimensions of the motor may be provided.

The analysis tool uses these parameters to determine automation devices in a manner known to one of ordinary skill in the art. For example, the analysis tool may use these parameters to determine suitable motors, which satisfy the specifications defined by the user in the input mask 13. The automation tool may then provide a list of suitable motors in a selection area 14.

To determine which hardware components are suitable based on the specified parameters, the analysis tool accesses a database 15. The database 15 stores a plurality of data relating to the automation components. As a cross-manufacturer database, the database 15 can include automation hardware of different manufacturers. When a plurality of, e.g., motors that match the specifications entered in the input mask 13, are presented to the user in the selection area 14, the user selects one of the motors. The selected automation hardware component thereby becomes part of a data record 16, which, when the selection for all the elements contained in the description has been made, represents the selected automation hardware. Once the specification of an automation hardware component has been completed in this manner, the analysis tool or possibly the user, himself or herself, selects a further element of the description, for which the method is repeated in the above-described manner.

The data record 16 representing the selected automation hardware components can be transmitted to an automation hardware supplier to obtain an offer, for example. An automation hardware supplier can also use the data record 16 to custom produce or configure individual automation hardware components based on the defined specifications. The data record 16 can moreover be published, e.g., on the Internet, so that each potential supplier can submit an offer for the selected automation hardware components. To create a website for bidding, a suitable forum or platform, e.g., a "B2B platform"(B2B=business to business), can be created on the Internet. The address of this website will be known to both potential customers and automation hardware suppliers, e.g., via email to potential suppliers or in any other manner known to one of ordinary skill in the art. Using this platform, the automation hardware suppliers can determine the customers' requirements early and respond with product innovations. The customer can identify the supplier with the most attractive offer. In addition, when it is time to order, the customer has greater flexibility regarding availability, price, conditions, delivery terms, etc.

Figure 2:
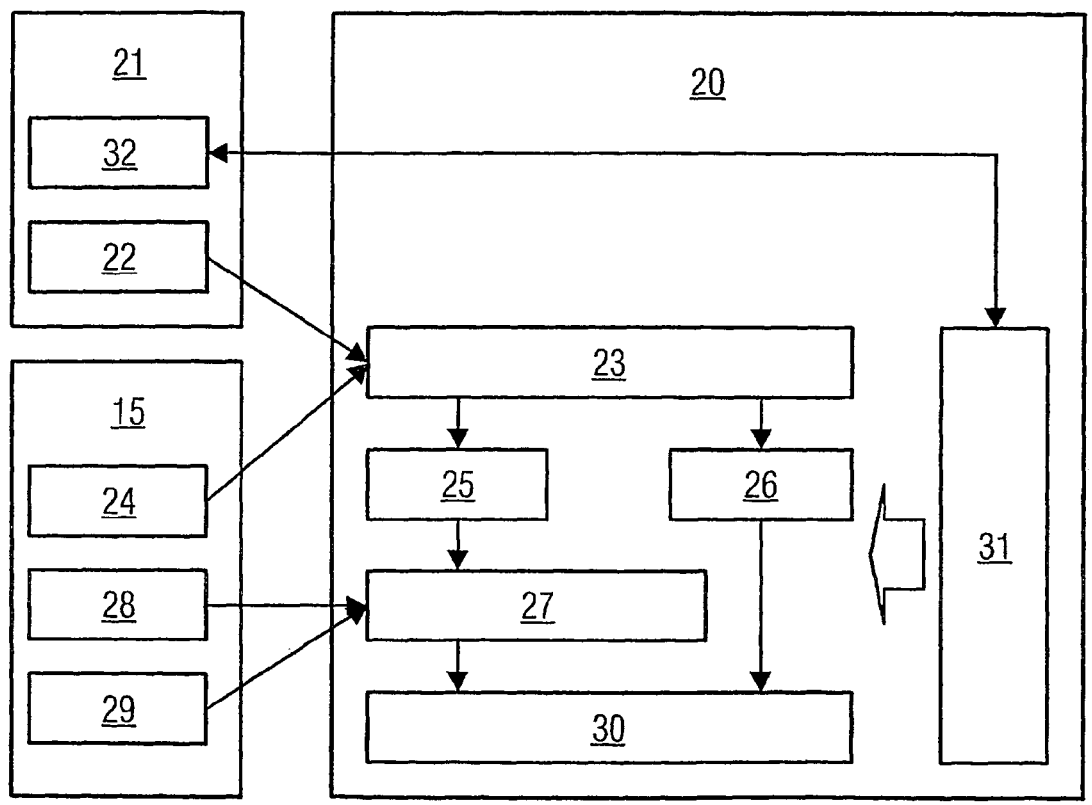
FIG. 2 is a schematic diagram of an analysis tool for executing the method of selecting and producing appropriate and necessary hardware, according to the exemplary, non-limiting embodiment of the present invention.

Next, FIG. 2 is a schematic representation of the analysis tool 20 to which input data 21 are supplied. The input data 21 include, as planning data 22, at least one electronically readable description of the automation solution in the form of a description of the corresponding technical process 10 to be automated. For example, the input data 21 may include, as planning data 22, the description or a design drawing of the technical process 10 depicted in FIG. 1. The planning data 22 are read into the system in standardized formats via standardized interfaces (not depicted). The planning data 22 can be provided in the form of standardized texts and/or graphics. The planning data 22 represent an engineering description of the respective technical process e.g., conveyor belt, weight to be transported, transport speed, conveyor belt length, etc. For example, the planning data 22 can be generated from a simulation, from CAD documents, or from plant descriptions. A modularization of the description of the technical process 10 can be achieved on the basis of an engineering description of individual elements of the technical process 10. The individual elements are described in standard description languages (text or graphics). The data are transferred using standard protocols and formats, e.g., XML.

To analyze the description of the technical process received as planning data 22, the analysis tool 20 has selection means 23, which is used for selecting and further describing individual automation hardware components as described above with reference to FIG. 1. For example, the selection means 23 can be a software module or modules or any equivalent thereof. Specifically, in selecting individual automation hardware components that match the specified parameters, the selection means 23 accesses a first matrix 24 in the database 15, which contains data relating to a plurality of automation components. The selections means 23 provides the user with a number of automation components from the first matrix 24 for user selection. The user selects a component from the proposed components. The selected component is then transferred to a component list 25. The same procedure is used for the remaining elements of the description, such that the final component list 25 includes all the automation hardware components necessary or appropriate for implementing the respective automation project.

The selection means 23 uses the elements of the description of the technical process 10 to generate automation requirements. To generate the automation requirements, the elements of the description are "reflected" in the first matrix 24, which contains, in particular, the catalog knowledge of automation suppliers. The electronic catalogs are appropriately structured for this purpose. The elements of the description are matched against system decisions based on the catalogs. For example, a description such as "conveyor path for bulk goods, length n meters, open-air," results in a selection such as "small control system in IP 65 with field bus for the actuator/sensor level." Additional engineering data (length, weight, speed, ambient conditions) are used to refine the selection of the small control system. The control type, drives, sensors, safety devices, etc. are selected from the first matrix 24. Additional boundary conditions can be defined in the dialog, e.g., preferred vendors, preferred types, special features of the plant, etc. Accordingly, the analysis tool 20 uses the database 15 to propose a solution that can be readily adopted without further configuration and/or modification. In other words, the user no longer needs to translate the engineering task into available automation components; this job is accomplished by the analysis tool 20.

Based on the component list 25, which represents the selected components of the automation hardware, and based on the selection means 23, a list 26 of the inputs and/or outputs for controlling and/or monitoring the technical process 10 is generated.

The component list 25 is fed to a means 27 for complexity calculation. The calculation means 27 can be a software module or any equivalent thereof. This calculation means 27 determines the complexity of the automation solution with respect to the mutual dependencies of the individual automation hardware components and uses so-called quantified project scopes. The calculation means 27 accesses a second matrix 28 in the database 15, which contains data on quantified project scopes, performance data, etc., and a knowledge base 29 in the database 15, which contains experience data from previous projects. For individual elements of the description of the technical process 10, in particular, frequently used elements representing functions or partial functions of technical processes, e.g., limit monitoring, limit switching, emergency OFF monitoring, etc., predefined solutions are provided, which can be parameterized as needed.

Capacity determination means 30 are provided for calculating the required capacity of "intelligent" components of the automation hardware, i.e., computing capacity and storage capacity of, e.g., stored program controllers. Capacity determination means 30 can be a software module or any equivalent thereof. The required capacity is calculated based on the selected components, i.e., using the component list 25, and based on the complexity of the automation solution determined by the complexity calculation means 27.

Accordingly, it is possible to determine, e.g., the capacity of a central processing unit of a stored program controller and the type and granularity of the inputs and outputs for the selected automation hardware components. The type and granularity of the inputs and outputs results, in particular, from the input and output list 26.

Each step of the method and each action of the analysis tool 20 can be supplemented by a query dialog 31 and respective user inputs 32. First, the analysis tool 20 displays the available data to guide the user in his selection or in the concretization of specifications that are already available. This occurs in representation 12 depicted in FIG. 1. Next, the analysis tool 20 proposes a solution derived from its database 15 (catalogs, expert knowledge, sample solutions, etc.) for each engineering task. This occurs in the selection area 14 depicted in FIG. 1. The user may also provide additional or missing information or alternative solutions in the query dialog 31. This corresponds to the input of specifying parameters in the input mask 13 depicted in FIG. 1. The analysis tool 20 can prompt a user entry 32 if data are missing or if equivalent alternatives are calculated. Likewise, this is achieved in the input mask 13.

The dialogs 31 are correlated with the engineering components and the sample solutions available in the database 15. As a result, the data representing the conveyor belt, for example, are connected directly with dialogs 31 for further queries relating to the required motors, for example.

The analysis tool 20 dynamically matches these dialogs 31 to the current state of the analysis. In other words, the dialogs depend on the previously made selection and on the previously generated results. Additional information can be determined from the previously read in technical plant description data, e.g., communication connection to the corporate network, detection of the amount of goods transported by the conveyor belt for the MES/ERP system (Manufacturing Execution/Enterprise Resource Planning system), etc.

The data record 16 is then derived from all the data thus determined. This data record 16 can be transmitted to suppliers of automation hardware components to obtain quotes and/or price estimates. The supplier can also use the data record or, if applicable, significant portions thereof, for production control to enable individual, customized production of some or all of the automation components.

According to the exemplary, non-limiting embodiment of the present invention, a method is provided for selecting and/or producing automation hardware appropriate or necessary for controlling and/or monitoring a technical process to be automated according to an automation solution. First, a description of the automation solution is developed. This description is then analyzed and finally, based on the analysis of the description, the respective automation hardware is selected and, if necessary, produced.

The above description of illustrative, non-limiting embodiment and variations thereof has been given by way of an example. The above and other features of the invention including various novel method steps have been particularly described with reference to the accompanying drawings and pointed out in the claims. It will be understood that the particular process and construction of parts embodying the invention is shown by way of an illustration only and not as a limitation of the invention. The principles and features of this invention may be employed in varied and numerous embodiments without departing from the scope of the invention as defined by the appended claims and equivalents thereof.

What is claimed is:

1. A method for at least one of selecting and producing automation hardware for at least one of controlling and monitoring a technical process to be automated in accordance with an automation solution, the method comprising:

developing an electronically readable description of the automation solution, wherein the description of the automation solution is an engineering description which comprises description of at least parts of the technical process and description of at least some components of the automation hardware that is to be selected or produced, which are associated with the technical process;

analyzing the description of the automation solution using a computer-aided analysis tool;

supplementing the description of the automation solution through a dialog with a user initiated by the analysis tool, where the dialog relates to individual elements of the components of the automation hardware; and selecting the respective automation hardware based on the analysis of the description, wherein said analyzing comprises automatically determining, by the analysis tool, whether the at least some components provided for selection in the user dialog are suitable for at least one function of an associated part of the technical process and wherein said determining is based on the description of said at least one functions of the associated part of the technical process in the engineering description.

2. The method as claims in claim 1, wherein the description of the automation solution is a design drawing of the automation solution.

3. The method as claimed in claim 1, wherein the user dialog comprises an input of specifying parameters relating to individual automation hardware components.

4. The method as claimed in claim 3, wherein automation hardware components from the individual automation hardware components that belong together are selected b the automation tool based on the user input and the engineering description, and wherein the selected components match to parts of the technical process that belong together.

5. The method as claimed in claim 1, wherein the suitable components provided for selection in the user dialog are determined based on already selected automation hardware components.

6. The method as claimed in claim 1, wherein the suitable components provided for selection in the user dialog are further determined by the automation tool based on already selected automation hardware components.

7. The method as claimed in claim 1, wherein the components provided for selection in the user dialog are determined by using data from a database.

8. The method as claimed in claim 7, wherein the contents of the database result from previous selections of the automated hardware.

9. The method as claimed in claim 8, wherein the contents of the database result from previously selected individual components of the automated hardware and information on compatibility of individual components based on previous selections.

10. The method as claimed in claim 1, wherein the description of the automation solution is a control program for controlling the automation hardware that is to be selected.

11. The method as claimed in claim 10, wherein the control program for controlling the technical process considers a plurality of inputs assigned by the technical process and influences a plurality of outputs assigned by the technical process, and wherein an input list comprising the plurality of inputs and an output list comprising the plurality of outputs are the elements of the description, and wherein scope of the input list is used to select automation hardware in a form of input modules and scope of the output list is used to select the automation hardware in a form of output modules.

12. The method as claimed in claim 1, wherein after the selection of the automation hardware has been completed, a data record representing the selected automation hardware is transmitted to an automation hardware supplier and a quote for the selected automation hardware is thereby obtained or a purchase order for the selected automation hardware is generated.

13. The method as claimed in claim 12, wherein the automation hardware or the components thereof are custom produced according to the selection made.

14. The method as claimed in claim 13, wherein the automation hardware supplier uses the data record representing the selected automation hardware to custom produce individual components of the automation hardware.

15. The method as claimed in claim 1, further comprising producing the selected respective automation hardware, wherein, prior to the producing of the selected automation hardware, the individual hardware components of the selected automation hardware are checked for compatibility with each other, and wherein, when a hardware component from the individual hardware components is incompatible with another individual hardware component from the individual hardware components, the automation toot automatically replaces one of the incompatible individual hardware components with a compatible individual hardware component.

16. The method of claim 1, wherein the suitable components provided for selection in the user dialog are determined based on already selected automation hardware components of a different supplier.

17. The method of claim 1, wherein said determining of the suitability of the at least some components provided for selection in the user dialog is performed after all of said at least some components are selected in the user dialog box.

* * * * *